JOSEPH KIESER.

Improvement in Torsion-Springs for Vehicles.

No. 127,169. Patented May 28, 1872.

Witnesses:
John Kiefer
Gottlieb Niess

Inventor:
Joseph Kieser 127,169

UNITED STATES PATENT OFFICE.

JOSEPH KIESER, OF NEW YORK, N. Y.

IMPROVEMENT IN TORSION-SPRINGS FOR VEHICLES.

Specification forming part of Letters Patent No. 127,169, dated May 28, 1872.

SPECIFICATION.

I, JOSEPH KIESER, of the city, county, and State of New York, have invented a new and useful Improvement in Wagon-Springs, of which the following is a specification:

My invention has for its object to overcome the difficulties attending the use for wagons of the "Hersey" torsion-spring, and to adapt the resistance and yielding of the elasticity of the said spring and similar springs, proportionately and automatically, to the requirements of different loads placed on the wagon; and it consists in the peculiar construction for said purpose of a support or working-surface for the said springs, and in forming the ends of the springs in accordance with the said support, as will be hereinafter more fully described.

Figure 1:
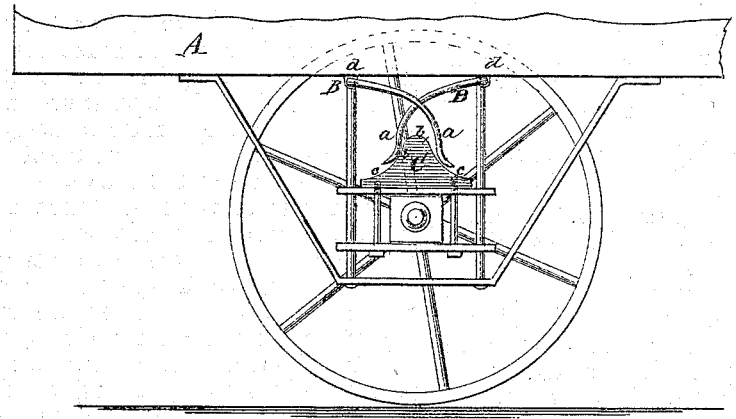
Figure 2:
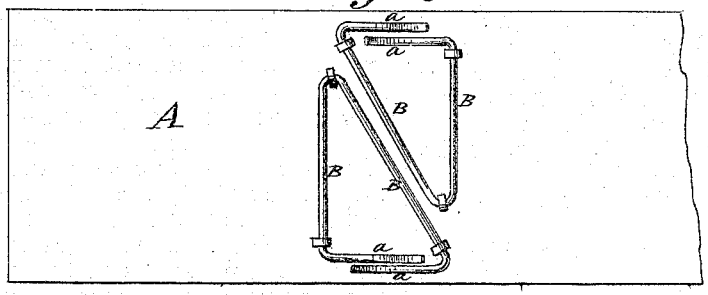
Figure 3:
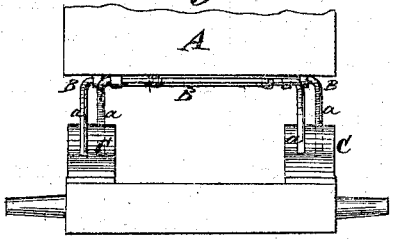
Figure 4:
Figure 5:

In the accompanying drawing, Figure 1 is a side view of a portion of a wagon with my improvement applied. Fig. 2 is a view of the under side of the body of a wagon, showing the position of the springs when attached. Fig. 3 is an end view of Fig. 1. Figs. 4 and 5 are modifications of the support.

Similar letters of reference indicate like parts.

A is the body of the wagon, to which are attached the torsion-springs B, the ends $a$ of which are bent, as seen in the drawing, and rest on the support C attached to the axle E. To the supports C I give the form of a double incline, (or two single inclines,) of either concave, convex, (or both,) or straight inclination of the surface, as seen in Figs. 1, 4, and 5, against which the ends $a$ of the springs B work, sliding more or less apart, according to the weight placed on the wagon. The preferable form of the support C is that shown in Fig. 1.

For a heavy load, the ends $a$ of the spring B will diverge or separate and slide down on the lower part $c$ of the support C, and the resistance or the degree of torsion of the spring B will increase in a more rapid ratio as the point of contact moves outward where the curve $c$ approaches the horizontal line. For a light load, as when only one person rides on the wagon, the ends $a$ of the spring B will converge, sliding upward on the curve $b$ of the support C, the strain or torsion decreasing in a gradually-diminishing ratio as the point of contact moves higher up on the curve $b$.

In the form shown in Fig. 4, contact with the curve $c$ does not increase the "ratio" of tension for a heavy load as compared with that of a lighter load, whereas in the form shown in Fig. 5 the ratio is everywhere the same; therefore the construction of C, as shown in Fig. 1, is the most effective.

The upper curves of the ends $a$ are made for the purpose of preventing contact with the top of curve $b$, when for a heavy load the lower ends spread far apart on the curve $c$, as such contact would shorten the leverage of torsion and cause an unyielding resistance, and thereby a sudden shock; but this being prevented by the said curves, and the surface of the support C in every point of contact being such that the power to twist the spring around its center $d$ of torsion acts at right angles (or nearly so) to the radius of torsion, the springs are made to act with uniform elastic softness under greatly different weights. The top of the support C, never being in contact with the spring B, may be made flat, hollow, or of any other shape. With the flat, horizontal support heretofore used this result could not be attained for a light load, the direction of the power in that construction being always perpendicular, and when the ends $a$ would come near together the radius or lever of the power would be extremely shortened and the springs, after unloading the wagon, very unyielding; besides, the springs invariably wear a hollow in a flat support, in which their sliding motion is checked, and they break when under a heavy load on a rough road.

Claims.

1. As a means of adjusting automatically the tension of a torsion-spring for vehicles according to the requirements of the load, the support or working-surface C, when constructed to operate in the manner shown and described.

2. The torsion-spring B, bent at its lower end, as shown, in combination with the support C, all constructed and arranged substantially as set forth.

JOSEPH KIESER.

Witnesses:
JOHN KIEFER,
GOTTLOB NIESS.